Dec. 4, 1934. F. M. VENZIE Re. 19,391
CEILING CONSTRUCTION
Original Filed May 17, 1930
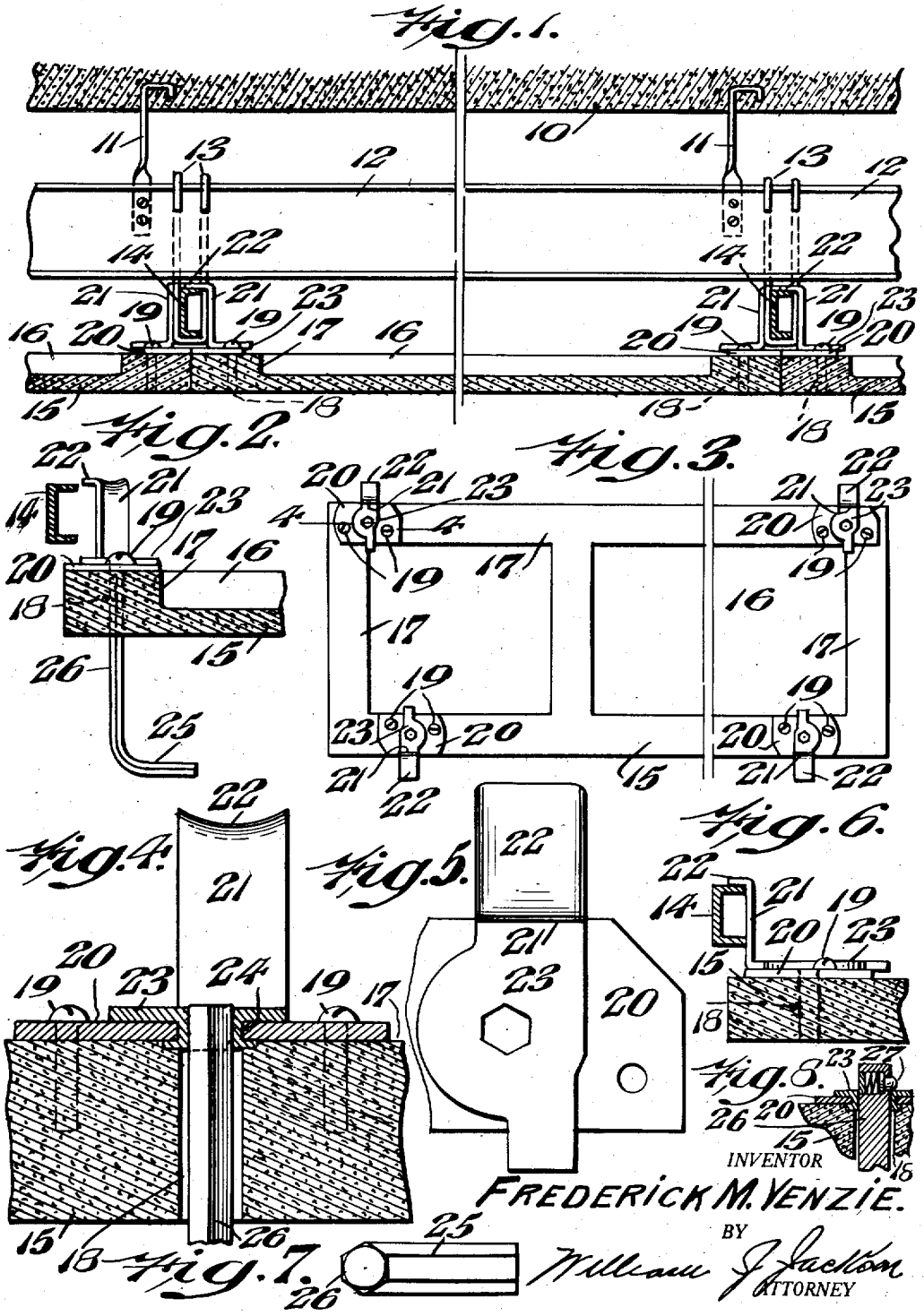
INVENTOR
FREDERICK M. VENZIE.
BY
William J. Jackson
ATTORNEY Reissued Dec. 4, 1934 Re. 19,391

UNITED STATES PATENT OFFICE 19,391

CEILING CONSTRUCTION

Frederick M. Venzie, Philadelphia, Pa.

Original No. 1,816,450, dated July 28, 1931, Serial No. 453,141, May 17, 1930. Application for reissue March 22, 1933, Serial No. 662,031

17 Claims. (Cl. 72—118)

This invention, generally stated, relates to building structures and has more especial relation to a novel form of ceiling construction in which plaster blocks, slabs, or tiles are employed.

As commonly practiced in the plasterer's trade, precast plaster blocks, slabs or tiles when once positioned in a ceiling construction form a permanent part thereof and should access to the space thereabove be desirable, for instance, to inspect wiring, pipes, or the like, it becomes necessary to tear down one or more complete blocks, slabs or tiles which when so removed are useless for replacement. These blocks, slabs, or tiles are relatively large and more or less expensive, and in case a number thereof are required to be removed it is apparent that the building costs are appreciably increased.

Such blocks, due to their weight and for other reasons, heretofore have been attached to supporting members prior to the laying of a floor thereabove, and hence access to the space between the floor and the ceiling usually has been obtained by breaking through the floor rather than through the ceiling.

Furthermore, heretofore when slabs have been used, the means of supporting them has resulted in slight irregularities in the positioning of the facing surfaces of the units so that a coating of plaster is necessitated in order to present an even surface.

One object of the present invention is to overcome these disadvantages and provide a novel form of ceiling construction in which pre-cast blocks, slabs or tiles may be taken down and replaced at will without destroying the usefulness of the same.

A further object of the present invention is to provide a construction of this kind which ceiling units may be cheaply manufactured at a central plant and shipped for erection, and which units may be expeditiously put up and taken down by unskilled labor.

A still further object of the present invention is to provide a pre-cast block, slab, or tile for erection and replacement purposes so arranged that the means for attachment to and removal from a channel iron are hidden from view when the unit is in its normal functioning position.

Another object of my invention is to provide a novel construction in which the ceiling slabs are suspended with their faces in a common plane and their edges in abutting relationship so that the need for applying a finished coating of plaster is eliminated.

Another object of my invention is to provide a novel construction in which preformed surfacing units may be suspended from below a floor or other supporting structure after the latter has been completed.

A still further object of the present invention is to provide a ceiling unit of the character stated in which in its normal functioning position it has the appearance of a conventional plaster block, slab or tile yet which may be readily removed without destroying the ceiling structure or unit itself.

Other and further objects of the present invention reside in the provision of general details of construction and in the arrangement, combination, and connection of parts for attaining the results sought by the foregoing objects.

With these and still other objects in view, as will hereinafter appear, the invention consists of the novel construction and arrangement of parts as will hereinafter more fully appear.

The nature, characteristic features and scope of the invention will be more fully understood from the following description taken in connection with the accompanying drawing forming part hereof, and in which:

Fig. 1 is a view in horizontal section of a ceiling construction embodying the invention and illustrating several pre-cast blocks, slabs, or tiles in normal functioning position;

Fig. 2 is a fragmentary view in section illustrating the manner of disengaging one of the blocks, slabs, or tiles from the position disclosed in Fig. 1;

Fig. 3 is a top or plan view of one of the blocks, slabs, or tiles shown in Fig. 1 in detached position;

Fig. 4 is a view in section taken upon the line 4—4 of Fig. 3;

Fig. 5 is a top or plan view of one of the latching devices shown in Figs. 1 to 4 in detached position;

Fig. 6 is a fragmentary view in section illustrating a pre-cast block, slab or tile of solid construction in lieu of the hollowed type shown in the foregoing figures;

Fig. 7 is a top or plan view of the key shown in Fig. 4; and

Fig. 8 is a fragmentary view in section illustrating a modified form of key.

For the purpose of illustrating my invention I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangement and organization of the instrumentalities as herein shown and described.

Referring now to the drawing in detail, the reference numeral 10 designates a floor of concrete, supported in any suitable and well known manner, anchored in which are straps 11 for supporting channel irons 12. The channel irons 12, as shown in Fig. 1, and as is common practice are aligned in a common horizontal plane. Suspended from the channel irons 12 by means of hangers 13 are other channel irons 14 which are arranged at right angles to the channel irons 12, see Fig. 1. Each of these sets of channel irons may be of the type known to the trade as plasterer's channels, the larger ones being approximately two and one half inches wide and the others being as small as three quarters of an inch. These have been used in the past for suspending metal lath, plaster board, or similar materials to which a finishing coat of plaster is to be applied and which need support intermediate the floor supporting beams to which they might otherwise be attached.

The present invention has to deal with means for suspending from the channel irons 14 a ceiling structure of the type comprising a plurality of pre-cast blocks, slabs or tiles of cementitious material which in position form the finished ceiling and are designed to eliminate the need for a finishing coat of plaster. Each slab is of quite large dimension and relatively expensive, particularly when it must be discarded because as commonly practiced in the plasterer's trade it is necessary to break a block, slab, or tile away from adjacent units to permit inspection of wiring or pipes below the floor 10. According to the present invention I precast blocks, slabs, or tiles of cementitious material at a central plant and ship to desired location for detachable connection to the channel irons 14 so that the said blocks, slabs, or tiles may be readily installed and detached by unskilled labor. The blocks, slabs, or tiles 15, as shown in Figs. 1, 2, and 3, are hollowed out at 16 to provide an air space for sound deadening purposes and have marginal ledges 17 with vertically arranged openings 18 therethrough, see Fig. 4, for the insertion therethrough of a key for a purpose to presently appear. Fixed upon the ledge 17 of each block, slab or tile at each of the four corners thereof by means of screws 19 is a thin, flat plate 20, best seen in Fig. 3. Mounted upon each plate 20 for at least partial rotation around its vertical axis is a finger 21 having a hooked terminal 22 and a base plate 23 having swivelled relation at 24, see Fig. 4, with the plate 20. The swivelled portion of each base plate 23 is apertured in alignment with the apertured part 18 of a block, slab or tile, see Fig. 4, to receive the end of a removable key best seen in Figs. 2, 4, and 7. The key comprises a handle 25 and shank 26, which latter is preferably of hexagonal cross section to cooperatively engage with the opening through the swivelled part of the base plate 23, whereby the base plate 23 and its finger 21 may be shifted about a vertical axis to cause the hooked terminal 22 to engage or be disengaged from a channel iron 14. Thus, a workman, standing upon a scaffold beneath a ceiling being erected, positions a block, slab, or tile between adjacent channel irons 14 and introduces the above described key through the various openings 18 in the blocks, slabs or tiles to engage the hexagonal openings in the swivelled base plates and by a slight twist of the wrist causes the fingers one at a time to engage over the tops of the channel irons 14. In the connection it is to be noted that the fingers of the blocks, slabs or tiles are arranged in staggered relation so that the fingers of adjacent blocks, slabs, or tiles do not overlap one another when positioned as shown in Fig. 1. Obviously to remove one or more blocks, slabs, or tiles from the position shown in Fig. 1, the workman merely introduces his key through the various apertures before described to disengage the hooked ends of the fingers from the channel irons 14, whereupon the blocks, slabs or tiles are free to be lowered. Should it be desired I may provide the outer end of a key with a spring pressed detent 27, as shown in Fig. 8, so that in case a block, slab or tile sticks in trying to remove the same the key may be pushed further up through the aperture in the base plate 23 until the spring pressed detent assumes the position shown in Fig. 8, whereupon downward pull of the key causes dislodgment of the block, slab or tile. Obviously if desired the top of the key may be provided with screw threads to engage screw threads in the aperture of a base plate, or other forms of keys may be employed to cause disengagement of tight fitting blocks, slabs, or tiles, the important feature, however, being to provide a key for moving the hooked end of a finger from a channel iron 14. The blocks, slabs, or tiles 15 may be of solid cross section as shown in Fig. 6 if desired instead of hollowed out as shown in the other figures, and the blocks, slabs, or tiles may be reinforced or not as desired.

What I claim is:

1. In a ceiling construction, a pair of suitably supported channel irons, a pre-cast ceiling unit of cementitious material arranged therebeneath and spanning the channel irons, said unit having arranged upon its upper face opposed, substantially hook-like members movable about their vertical axes for engagement with said channel irons to removably suspend said units, said units and members being apertured in vertical alignment to accommodate a removable tool to secure shifting of said hook-like members.

2. In a ceiling construction a pair of suitably supported channel irons, a rectangular shaped pre-cast ceiling unit of cementitious material arranged therebeneath and spanning the channel irons, said unit having arranged upon its upper face adjacent its respective corners opposed, substantially hook-like members movable about their vertical axes for engagement with said channel irons to removably suspend said units, said units and members being apertured in vertical alignment to accommodate a removable tool to secure shifting of said hook-like members.

3. In a ceiling construction a pair of suitably supported channel irons, a pre-cast ceiling unit of cementitious material arranged therebeneath and spanning the channel irons, said unit having arranged upon its upper face opposed, substantially hook-like swivelled members movable about their vertical axes for engagement with said channel irons to removably suspend said units, said units and members being apertured in vertical alignment to accommodate a removable tool to secure shifting of said hook-like members.

4. In a ceiling construction a pair of suitably supported channel irons, a pre-cast ceiling unit of cementitious material arranged therebeneath and spanning the channel irons, said unit having arranged upon its upper face opposed, substantially hook-like members arranged in staggered relation and movable about their vertical axes for engagement with said channel irons to removably suspend said units, said units and members being apertured in vertical alignment to accommodate a removable tool to secure shifting of said hook-like members.

5. In a ceiling construction a pair of suitably supported channel irons, a pre-cast ceiling unit of cementitious material arranged therebeneath and spanning the channel irons, said unit having arranged upon its upper face opposed, substantially hook-like members movable about their vertical axes for engagement with said channel irons to removably suspend said units, a metal base detachably secured to said unit for supporting each hook-like member in swivelled relation, said units and members being apertured in vertical alignment to accommodate a removable tool to secure shifting of said hook-like members.

6. A room interior construction comprising a support, a multiplicity of units adapted to form an interior surface for said room; an intermediate support between said first named support and said units supported by the former and supporting the latter; said units being arranged in abutting relationship; and means, operable from the room side of said units and concealed by said units, for attaching and detaching each of said units to and from said intermediate support.

7. A room interior construction comprising a support, a plurality of channel members carried by said support, a plurality of units carried by said channel members, each of said units comprising a fireproof rigid structure and also means for detachably connecting individual units to said channel members.

8. A room interior construction comprising a support; a plurality of rigid fireproof units; intermediate supports, means for suspending said intermediate supports below and in spaced relationship with said first named supports; said units being arranged in abutting relationship, and means for attaching said units to said intermediate supports.

9. A room interior construction comprising a support, a multiplicity of rigid surfacing units, and means for detachably connecting each of said units to said support independently of the others, said means forming a part of each of said units and accessible from the room side thereof.

10. In a room interior construction, a support, a multiplicity of rigid abutting interior surfacing units, and means carried by said units for removably connecting each of said units, individually, to said support.

11. A ceiling construction comprising a support; a multiplicity of surfacing units; hooks connected to each of said units said hooks being movable in a plane parallel to the face of said units into engagement with said support.

12. A ceiling construction comprising a completed floor, a support below said floor, a plurality of abutting units below said support, and means, carried by each of said units and operable from below said floor, connecting said units to said support.

13. A building construction comprising a multiplicity of channel beams forming a support for a ceiling; a multiplicity of rigid fireproof surfacing units; a multiplicity of plasterer's channels; hangers, suspending said plasterer's channels from and in spaced relationship beneath said beams, and means for attaching said units to said plasterer's channels.

14. In a room interior construction, supports; a multiplicity of rigid surfacing units each having one face adapted to form a portion of the interior surface of a room; and means for individually detachably connecting each of said units to said supports, said connecting means lying behind the surfacing faces of said units and operable from the room side thereof.

15. In a room interior construction, supports; a multiplicity of rigid surfacing units each having one face adapted to form a portion of the interior surface of a room and movable hooks for individually detachably connecting each of said units to said supports; said hooks lying behind the surfacing faces of said units and operable from the room side thereof.

16. A ceiling construction comprising a support, surfacing units, hooks fixed to said surfacing units, said hooks including a receptacle for receiving a removable tool insertable from the room side of said units for operatively connecting said hooks with said support.

17. A ceiling construction comprising a floor; channel members carried by said floor; fireproof surfacing units below said channel members; and hooks in detachable engagement with said channel members, said hooks having movable portions in said units and being positioned within the marginal boundaries thereof.

FREDERICK M. VENZIE.